Patented Feb. 23, 1954

2,670,337

UNITED STATES PATENT OFFICE 2,670,337

COMPOSITION FOR PRODUCING WRINKLE-TEXTURED FILMS

Harry A. Toulmin, Jr., Dayton, Ohio, assignor to New Wrinkle, Inc., Dayton, Ohio, a corporation of Delaware No Drawing. Original application November 17, 1949, Serial No. 127,972. Divided and this application July 9, 1951, Serial No. 235,846

1 Claim. (Cl. 260—31.2)

This invention deals with a process and apparatus for making wrinkled films having a predetermined pattern and with the products obtained therewith.

This application is a division of my co-pending application, Serial No. 127,972, filed November 17, 1949, now Patent No. 2,595,734, which application was a divisional of application Serial No. 739,970, filed April 7, 1947, now Patent No. 2,511,024.

It is an object of this invention to provide films having an ornamental pattern of a very pleasing appearance, the design of which may be easily controlled or modified.

It is another object of this invention to provide wrinkle-textured films, the pattern of which may be modified in numerous ways while using the same materials and the same devices.

It is still another object of this invention to provide wrinkle-textured films which have a predetermined pattern in a very simple and inexpensive manner.

It is still another object of this invention to provide wrinkle-textured films with a predetermined pattern from materials which have been held non-wrinkling heretofore.

These and other objects are accomplished broadly by providing a support with a design, superimposing thereover a layer of a solution of non-wrinkling thermoplastic resin, causing predetermined areas of the surface of said layer to wrinkle by differential heating of said layer until skin formation has set in in the areas to be wrinkled and then applying water to the surface whereby the skinned areas obtain a wrinkled texture.

As the support for the resin film, various materials are usable. These, metal, e. g. copper, stainless steel, or paper, glass, wood and many others have been found satisfactory. While the support may be used in the form of a plain sheet, it is particularly advantageous to employ a continuous belt for the purpose of my invention.

The design may be applied to the support by various methods; thus, it may be applied by etching, carving, embossing, or engraving. For instance, an etched metal belt as it is being used for lithographic printing was found advantageous. The pattern desired may also be printed onto the belt or support with an ink that is compatible with the thermoplastic resin. Moreover, a combination of embossing or engraving with printing may be used. In this case the ink pattern may either coincide with regard to the relief pattern, or else it may be arranged at different areas. In the first case, the pattern obtained by one method is emphasized by that obtained by the other method, whereas in the latter case an additional effect results. For instance, one method may provide for instance advertising matter, while the other method may supply a design pattern for purely ornamental character.

All thermoplastic resins are usable for this invention. Among the many resins which have been found satisfactory are vinyl acetate copolymers, vinyl chloride copolymers or mixtures of these two, chlorinated rubbers, styrene polymers and copolymers, cellulose acetate, cellulose acetate butyrate, cellulose acetate propionate, methyl cellulose, vinyl butyrate, polyethylene, butadiene copolymers such as butadiene acrylonitrile and butadiene styrene copolymers, methyl methacrylate, vinylidene copolymers, vinyl alcohol polymers, vinyl chloride-vinylidene chloride copolymers and mixtures of these substances.

In the following example a formula is given which proved particularly satisfactory:

EXAMPLE 25 grams vinyl acetate-vinyl chloride copolymer (ratio 5 parts by weight: 95 parts by weight)
50 grams butyl acetate
102.5 grams methyl ethyl ketone
62.5 grams cyclohexanone
10 grams dioctyl phthalate The mixture was preferably heated before application, because the solution is gelled at room temperature.

As the solvents for the resin those are preferred which have a high evaporation rate; methyl ethyl ketone, acetone, butyl acetate, cyclohexanone, xylol, toluol, toluol with nitroparaffin, amyl acetate are a few examples for those solvents that were used with satisfaction. A concentration of from 10 to 65 parts by weight of resins in 100 parts by weight of the solution is operative, the concentration and viscosity best suitable being dependent upon the method by which the film is to be applied to the support.

For spraying, a viscosity of approximately 36.2 centipoises at 25° C. was found to be proper.

The film may be applied to the support by spraying, knifing, rolling or other methods known to those skilled in the art. A less viscous solution is required if spraying is chosen than if other methods of application are used.

Heating of the film for the purpose of skin formation is preferably carried out by means of infrared rays, the time of exposure being greatly dependent on the composition used, in particular on the boiling point and the evaporation rate of the solvent used, and on the nature of the base material. Normally a heating time of from 30 seconds to 4 minutes suffices.

Heating may be effected over the entire surface of the resin layer whereby a skin is formed all over, or at predetermined sections of the surface only, whereby a pattern results which is composed of smooth and wrinkle-textured areas.

In order to effect selective heating, a template is advantageously used. This template may be made of heat insulating material and have cut-outs corresponding to the desired pattern, in which case skin formation sets in at those areas of the film which are underneath said cut-outs, whereas the areas protected by the insulating material of the template will still be too cold as to develop a skin. On the other hand, a template may also be used which consists of a material of very good heat conductivity, for instance, which is made of a particularly well conducting metal; in this case a skin will develop first in those areas which are located underneath the metal parts of the template, whereas the sections underneath the cutouts will remain free from skin for a longer period of time. It will be obvious that in the former case the pattern itself, with which the cut-out parts are meant, obtain a skin and will wrinkle later on under the influence of water, whereas in the latter case the background rather than the pattern itself will skin and wrinkle. However, in either case the conditions may be reversed by merely heating the film so long as to cause hardening of the earlier formed skin and initial development of the skin in the parts heated more slowly; then the water will affect merely the soft skin which has just formed whereas the already hardened skin will remain smooth upon the application of water.

The template may be held stationary, in which case the support has also to be kept in place in order exactly to reproduce the pattern of the template and not to transform it into stripes or streaks. However, the entire process may also be carried out in a continuous manner by using an endless belt and a traveling template in which case both have to be driven with the same speed.

Faucet water is operative for the purpose of producing the wrinkles in the process of my invention. However, it is preferred, and better results are obtained, if a wetting agent is added to the water. All wetting agents known in the art are usable. I have obtained excellent results, for instance, with the sodium sulfate of 3,9-diethy-tridecanol-6, and in particular with a concentration of approximately 3% thereof. The water may be applied either by spraying it thereon or by immersing the film, an immersion time of from 5 to 20 minutes being sufficient in the latter case.

After the water has been applied, the film is peeled from the support. This may be carried out by means of a knife or blade. Peeling is considerably facilitated though, if the support with the film is immersed into an aqueous solution of trisodium phosphate of approximately 10% concentration prior to peeling.

Thereafter the isolated film is dried; this step may be either performed by letting the film air-dry or by the use of forced drying or by a combination of the two. It was found particularly advantageous first to heat the film for a short period of time in order to accelerate evaporation of the solvent and thereafter to allow the film to air-dry. Sometimes forced drying for only a fraction of a minute was found sufficient to initiate evaporation.

Instead of using a trisodium phosphate solution for the purpose of facilitating peeling, it was also found helpful to lubricate the support before the application of ink and resin solution. In this case, however, drying is preferably carried out prior to peeling. It will be understood that a great many additional materials may be added to the ink or to the resin material. Thus, for example, plasticizers, e. g. tricresyl phosphate, dioctyl phthalate, dibutyl phthalate, may be added to the resin. Metal powders may be applied either to the support or incorporated into the ink or into the resin solution. In case of the film material being transparent, such metal powders give an especially pleasing effect. Likewise, the addition of autoluminescent materials was found to have a very favorable influence on the appearance of the final film.

A pattern may also be developed by incorporating into the ink or the resin material a pigment or dye the color of which is developed under the influence of specific light rays, for instance of infrared light or of ultra-violet light. In the case of materials sensitive to ultra-violet light, a step has to be inserted prior to heating with infrared light, namely, a step of exposure to ultra-violet light for the purpose of developing the color of such materials. A pattern may be obtained in such a case, for instance, by uniformly coating the entire surface of the support with a layer of ink and/or thermoplastic resin either or both of which may contain the ultra-violet sensitive material. A pattern may then be developed by selectively applying ultra-violet rays which may also be carried out by means of a template.

Although, in this case the application of a pattern by means of etching, ink, or the like is not necessary, both methods may still be combined and additional effects be obtained thereby. Moreover, the pattern or appearance of such films may be modified by causing wrinkle formation over their entire surface or in predetermined areas thereof only. All kinds of phosphorescent and luminescent materials known to those skilled in the art may also be added to the ink or resin substances in order to obtain additional light effects in the product of my invention. It will thus be seen, that a great number of possibilities exist by which various modifications may be obtained by the process of this invention.

The products obtained by the process of this invention may be used for ornamental purposes or for displaying printed matter, for instance for signs or other advertisement, or for a combination of both.

It will be understood that while there have been described herein certain specific embodiments of the invention, it is not intended thereby to have it limited to or circumscribed by the specific details given in view of the fact that this invention is susceptible to various modifications and changes which come within the spirit of this disclosure and the scope of the appended claim.

I claim:

A coating composition for application to a surface and drying to a wrinkle texture film consisting of 25 parts by weight of vinyl acetate-vinyl chloride copolymer in the ratio of 5% of vinyl acetate and 95% of vinyl chloride, 50 parts by weight of butyl acetate, 102.5 parts by weight of methyl ethyl ketone, 62.5 parts by weight of cyclohexanone and 10 parts by weight of dioctyl phthalate, and a coloring material, said composition gelling at room temperature.

HARRY A. TOULMIN, Jr.

References Cited in the file of this patent

UNITED STATES PATENTS

| Number | Name | Date |
|---|---|---|
| 2,349,413 | Hemperly | May 23, 1944 |
| 2,450,435 | McGillicuddy | Oct. 5, 1948 |
| 2,510,966 | Flanagan | June 13, 1950 |
| 2,530,441 | Reinhardt et al. | Nov. 21, 1950 |